United States Patent [19]

Doss

[11] 4,113,914

[45] Sep. 12, 1978

[54] PROCESS FOR APPLYING SEALANT COMPOSITION

[75] Inventor: Richard C. Doss, Bartlesville, Okla.

[73] Assignee: Phillips Petroleum Company, Bartlesville, Okla.

[21] Appl. No.: 794,893

[22] Filed: May 9, 1977

[51] Int. Cl.² ............................................. C08L 91/08
[52] U.S. Cl. ...................................... 428/355; 260/25; 260/27 BB; 260/42.28; 260/836; 260/837 R; 427/140; 427/142; 427/386
[58] Field of Search .................. 260/42.28, 27 BB, 25, 260/837 R, 836; 428/355, 413, 417, 418; 427/386, 207, 140, 142

[56] References Cited

U.S. PATENT DOCUMENTS

| 3,027,337 | 3/1962 | Tritsch | 260/5 |
| 3,239,478 | 3/1966 | Harlan | 260/27 BB |
| 3,370,104 | 2/1968 | O'Brien et al. | 260/837 R |
| 3,766,295 | 10/1973 | Crossland et al. | 260/27 BB |
| 3,870,676 | 3/1975 | Condon | 260/837 R |
| 3,879,248 | 4/1975 | Kest | 260/27 BB |
| 3,917,607 | 11/1975 | Crossland et al. | 260/27 BB |
| 3,950,291 | 4/1976 | Jurrens | 260/27 BB |

OTHER PUBLICATIONS

Adhesives Age – Sep. 1974–pp. 32–35.
Adhesive Age – Feb. 1974–pp. 18–21.
Adhsives Age – Apr. 1975–pp. 17–21 – Peters et al.

Primary Examiner—V. P. Hoke

[57] ABSTRACT

The sealant composition comprising radial teleblock copolymers or hydrogenated linear or radial teleblock copolymers, an epoxy resin and a modifying resin exhibit good canvas peel strength.

8 Claims, No Drawings

PROCESS FOR APPLYING SEALANT COMPOSITION

The present invention relates to sealant compositions. More specifically, the present invention relates to sealant compositions comprising an epoxy resin, a modifying resin and a hydrocarbon block copolymer.

BACKGROUND OF THE INVENTION

Various sealing compositions have been disclosed in the prior art. Broadly, a sealant composition has been described comprising elastomeric polymers, plasticizing and tackifying resins and optionally adhesion promoters as well as fillers. Among the elastomeric polymers that have been proposed in the prior art sealant compositions as one of the ingredients are such elastomeric polymers as styrene-butadiene-styrene polymers and sytrene-isoprene polymers.

One of the important properties of a sealant is considered to be peel strength. This property describes the force necessary to peel the sealant off from the respective substrate. For sealant applications this peel strength should have a high value.

THE INVENTION

It is thus one object of this invention to provide a novel sealant composition.

Another object of this invention is to provide a sealant composition with particularly good peel strength.

Yet another object of this invention is to provide a process for sealing surfaces.

These and other objects, advantages, details, features and embodiments of this invention will become apparent to those skilled in the art from the following detailed description of the invention, the examples and the appended claims.

In accordance with this invention, it has been found that a sealant composition comprising a specific elastomeric block copolymer selected from a narrow group of polymers as will be defined, an epoxy resin, a modifying resin and a filler exhibits largely improved peel strength as compared to sealants without epoxy resin. The elastomeric copolymers used in the sealant composition of this invention are selected from the group consisting of a. polymers of the structural formula $(S-D)_m Y$, b. polymers of the structural formula $(S-D')_n Y$, and C. polymers of the structural formula $S-D'-S$, wherein S represents a block of polymerized styrene, D represents a block of polymerized butadiene or isoprene, D' represents a hydrogenated block of polymerized butadiene or isoprene, Y is a residue of a polyfunctional coupling agent or of a polyfunctional initiating agent, $m$ is an integer greater than 2 and $n$ is an integer of 2 or more.

The rubber-based sealants of this invention have been found to exhibit particularly desirable peel strength properties. Whereas the application of now known rubber-based sealants frequently necessitate the use of a primer coating to the substrate surface prior to contact with the sealant composition in order to obtain satisfactory adhesion of the sealant to the substrate, the sealant compositions of the present invention can frequently be used without a primer coating while the adhesion of the sealant composition to the surfaces as well as the cohesion of the sealant composition still have a satisfactory value.

The radial or branched block copolymers of the formula $(S-D)_m Y$ exhibit a degree of branching that is characterized by the value of $m$. It will be recognized by those skilled in the art that ideally $m$ would be an integer corresponding generally to the functionality of the coupling agent or the initiating species. In practice, however, the ideal degree of branching may not always be achieved. Therefore, $m$ will generally have a value of greater than 2 and preferably from 3 to 4.

The preparation of the rubbery polymers characterized by the three structural formulae given above is done according to processes well known in the art. For example, radial block copolymers can be made employing an organomonolithium initiating species and sequential addition of monomers to give a "living" polymer of the structure $S-D-Li$, which can then be coupled with a polyfunctional coupling agent, e.g., silicon tetrachloride, to give a polymer of the first of the three structural formulae shown above.

Processes for making the various polymers are described in more detail in the U.S. Pat. Nos. 3,281,383 and 3,639,521 and 3,251,905.

The hydrogenated linear or branched block copolymers having the formula $(S-D')_n Y$ and $S-D'-S$ comprise a hydrogenated block D' of polymerized butadiene or isoprene. This block has been hydrogenated subsequent to polymerization by means and procedures well known in the art. Generally, the hydrogenation is a catalytically promoted hydrogenation of the polymers in solution utilizing, e.g., a catalyst based on reduced nickel. The hydrogenation generally removes 95 percent or more of the original olefinic unsaturation leaving the aromatic unsaturation of the polymers essentially unchanged. Thus, the polymers contemplated by the two formulae given above generally will contain less than 5 percent of the original olefinic unsaturation.

The amount of styrene monomer used in the preparation of the rubbery copolymers as compared to the amount of alkadiene (butadiene or, respectively, isoprene) employed is not particularly critical. The weight of the alkadiene monomer utilized will be larger than the weight of the styrene employed and generally the weight ratio of the alkadiene to the styrene in the polymers utilized will be between 55/45 and 90/10, preferably in the range of 60/40 and 85/15.

The radial block copolymers having the formula $(S-D)_m Y$ incorporated into the sealant formulation of this invention have a weight average molecular weight in the range of 200,000 to 750,000, preferably in the range of 275,000 to 400,000. The hydrogenated linear or radial block copolymers of the formula $(S-D')_n Y$ and $S-D'-S$ also useful in the sealant formulations of the present invention generally exhibit a weight average molecular weight in the range of 50,000 to 500,000, preferably in the range of 80,000 to 250,000.

The epoxy resins which are useful in the sealant formulations of this invention are generally the reaction product of a dihydric aromatic compound and an epihalohydrin. Examples of suitable dihydric aromatic compounds include resorcinol, 1,1-bis(4-hydroxyphenyl)ethane, 2,2-bis(4-hydroxyphenyl)propane, 1,1- bis(4-hydroxyphenyl)butane and the like. Preferred reactants for the preparation of suitable epoxy resins are epichlorohydrin and 2,2-bis(4-hydroxyphenyl)propane (Bisphenol A).

Typical epoxy resins are those having an epoxy equivalent weight of between 170 and 225. Especially suitable are those commercially available under the trademark "Epon", e.g., Epon 828, which are epichlorohydrin/Bisphenol A condensation products of varying viscosities.

Modifying resins which are useful in the sealant formulation of this invention are generally those known in the sealant art, such as modified and unmodified rosin and rosin esters, esters of polymerized rosin, polyterpene resins, terpene-phenolic resins, coumarone-indene resins, diolefin-olefin resins, phenolaldehyde resins and the like.

The sealant formulations of this invention can contain, in addition to the above-described block copolymers epoxy resins and modifying resins, other ingredients well known to the sealant art such as plasticizers, fillers, pigments, solvents, stabilizers, and the like.

Fillers useful in the sealants of the present invention include calcium carbonate, aluminum silicate, clay, talc, kaolin, carbon black, and mixtures thereof. Such fillers frequently reinforce the sealant.

Materials which are generally known as plasticizers in the rubber, adhesive and sealant art are useful as plasticizers in the inventive sealant formulations. These generally include: low moleclar weight polyolefins, such as polybutenes; oils, including naphthenic, paraffinic or aromatic; methyl ester of rosin; liquid phthalate esters; polymeric esters; chlorinated hydrocarbons; and the like and mixtures thereof.

Pigments are frequently employed in the formulations of the present invention for the aesthetic value of the sealant as well as for their reinforcing properties. Any pigments can be employed to impart whatever coloration is desired to the final sealant. Carbon black and titanium dioxide are well-known pigments.

It is usually desirable to include stabilizers in the inventive formulations. Such stabilizers include antioxidants and antiozonants, as well as ultraviolet and thermal stabilizers. Hindered phenols, substituted phosphites, phenolic phosphites, dialkyl thiodipropionates, nickel dialkyldithiocarbamates and the like and mixtures thereof are examples of types of stabilizers which are particularly beneficial in the present invention.

The above-described ingredients of the inventive formulations are generally employed in amounts given in the following recipe.

Recipe

| Ingredient | Parts by Weight | |
|---|---|---|
|  | Broad | Preferred |
| Block copolymer | 100 | 100 |
| Epoxy resin | 1-30 | 10-25 |
| Modifying resin | 10-250 | 25-125 |
| Plasticizer | 0-300 | 25-225 |
| Filler | 25-250 | 50-200 |
| Pigment | 0-40 | 5-30 |
| Solvent | 0-300 | 0-200 |
| Stabilizer | 0-10 | 0.5-5 |

In accordance with a further embodiment of this invention, there is provided a process for sealing an area between two surfaces. This process comprises applying a composition as defined above to at least a portion of this area. This application of the novel composition defined above can be done in various ways. In one embodiment the sealant formulation is applied as a solvent release system. In this instance up to 300 parts by weight in the above-identified recipe of a solvent is utilized. The solvent preferably is a saturated aliphatic, a saturated cycloaliphatic or an aromatic hydrocarbon. Particularly preferred are those hydrocarbon solvents containing from 5 to 8 carbon atoms per molecule, such as pentane, hexane, heptane, octane, cyclohexane, benzene, toluene and xylenes. After application of the solution of the sealant composition, the solvent is released by evaporation.

Another way of applying the sealant composition to the area to be sealed is to form a hot melt of the sealant and to apply the molten sealant to the substrate. The sealant identified above will be sufficiently fluid for application to the surface when heated to a temperature in the range of about 120° to about 180° C.

Yet another possibility to apply the sealant composition is to form an emulsion of this sealant with, e.g., water, or another suitable emulsifying liquid and to remove the liquid subsequently.

The sealant formulations of this invention are useful in sealing a wide variety of substrates. All common materials of construction, such as glass, aluminum, steel, concrete, brick, rock, ceramic, wood, etc., can be sealed by use of the inventive sealant. The sealant-to-substrate bonds achieved by use of the inventive sealants are especially strong when the substrate surface is non-porous and relatively smooth, such as with glass or metallic surfaces, compared to the relatively rough or porous surfaces of concrete, brick, rock, wood, etc.

The following examples, which describe particularly preferred embodiments of this invention and compare the invention with similar sealant compositions, are intended to illustrate the invention further but not to unduly limit the scope thereof.

EXAMPLE I (Sealant with a Hydrogenated Linear Teleblock Copolymer)

The following inventive and comparative runs demonstrate the invention of a sealant based on a hydrogenated linear teleblock copolymer of butadiene and styrene.

Identity and proportions of the various components of the inventive and comparative runs are given in the following recipe.

Recipe I

| Ingredient | Parts by Weight |
|---|---|
| Hydrogenated copolymer[1] | 45 |
| Modifying resin[2] | 90 |
| Plasticizer[3] | 97.1 |
| Calcium carbonate | 40.3 |
| Titanium dioxide | 13.4 |
| Zinc oxide | 13.4 |
| Stabilizer[4] | 4.9 |
| Epoxy resin[5] | 0 (run 1) |
|  | 9 (run 2) |

[1]70/30 Weight ratio of butadiene/styrene polymerized to a weight average molecular weight of 90,000 and hydrogenated to <1% residual olefinic unsaturation. Corresponds to (S-D'-)$_n$Y structure with n = 2.
[2]Mixture of 45 parts by weight vinyl toluene/α-methylstyrene copolymer (Piccotex 120 from Pennsylvania Industrial Chemicals) and 45 parts by weight cycloaliphatic resin (Pexalyn XA 072 from Hercules).
[3]Polybutene (Indopol H-100 from Amoco).
[4]Mixture of 2.0 parts Agerite Geltrol (Vanderbilt), 0.5 parts dilauryl thiodipropionate, 1.2 parts octadecyl ester of 3-(3,5-di-tert-butyl-4-hydroxyphenyl) propionic acid (Irganox 1076 from Geigy Industrial Chemicals), and nickel bis(O-ethyl-3,5-di-t-butyl-4-hydroxybenzylphosphonate) (Irgastab 2002 from Geigy).
[5]Bisphenol A/epichlorohydrin condensation product (Epon 828 from Shell).

In Table I are given properties of sealants compounded according to the above recipe.

Table I

| | Run No. | |
|---|---|---|
| | 1(Comp) | 2 (Inv) |
| Epoxy resin, parts by weight | 0 | 9 |
| 50% Modulus, psi[1] | 30 | 37 |
| Tensile, psi[1] | 289.5 | 263 |
| % Elongation[1] | 537.5 | 489.5 |
| Hardness, Shore A[2] | 23 | 25 |
| Canvas peel, ppiw[3] | | |
| Glass, original | 2 | >34.5 |
| $H_2O$ treatment[4] | F[5] | F |
| Concrete, original | 5 | 7.5 |
| $H_2O$ treatment | 4.5 | 2.5 |
| Aluminum, original | 1.75 | >50 |
| $H_2O$ treatment | 3.25 | 8.7 |

[1]ASTM-D-412-66-
[2]ASTM-D-2240-68.
[3]Measured in pounds per inch width according to Federal Specification TT-S-230b.
[4]Immersion in water at room temperature for 7 days.
[5]Failed The data in Table I demonstrate the improved canvas peel strength for the inventive sealant of run 2 compared to a sealant formulation containing no epoxy resin in run 1. Water treatment for seven days reduced the strength of the inventive and comparative sealant.

EXAMPLE II (Radial teleblock copolymers)

The following runs illustrate the usefulness of inventive sealants based on radial teleblock copolymers of butadiene and styrene.

Identity and proportions of the various ingredients in the inventive and comparative runs are given in the following recipe.

Recipe II

| Ingredient | Parts by Weight |
|---|---|
| Radial teleblock copolymer | 45 |
| Modifying resin[1] | 90 |
| Paraffinic oil | 77.1 |
| Calcium carbonate | 40.3 |
| Titanium dioxide | 13.4 |
| Zinc oxide | 13.4 |
| Magnesium oxide | Variable |
| Stabilizer | Variable |
| Epoxy resin[2] | Variable |

[1]Mixture of 45 parts Piccotex 120 and 45 parts of either Pexalyn XA072 (Runs 3 and 4) or Pexalyn XA070 (Runs 5 and 6 - cycloaliphatic resin from Geigy).
[2]See footnote 5 of Recipe I.

In Table II properties of sealants compounded according to the above recipe are shown.

Table II

| Run No. | 3 (Comp) | 4 (Inv) | 5 (Comp) | 6 (Inv) |
|---|---|---|---|---|
| Radial Copolymer | A[1] | A | B[2] | B |
| Stabilizer | C[3] | C | D[4] | D |
| Magnesium oxide | 9 | 0 | 0 | 0 |
| Epoxy resin | 0 | 9 | 0 | 9 |
| 50% Modulus, psi | 25 | 28 | ND[5] | ND |
| Tensile, psi | 137 | 163 | ND | ND |
| Elongation, % | >700 | >700 | ND | ND |
| Hardness, Shore A | 12 | 25 | ND | ND |
| Canvas peel, ppiw | | | | |
| Glass, original | 2.25 | 45 | 10 | 45 |
| $H_2O$ treated | F | >42.5 | 1.5 | F |
| Concrete, original | 9 | 8 | 15 | 44.5 |
| $H_2O$ treated | 9.5 | 12 | 3.75 | 9.0 |
| Steel, original | 6.5 | 27 | ND | ND |
| $H_2O$ treated | 7.75 | >47.5 | ND | ND |
| Aluminum, original | ND | 63.75 | 27.5 | 24.25 |
| $H_2O$ treated | ND | 45 | 13 | 6.5 |

[1]70/30 Butadiene/styrene radial teleblock copolymer coupled with $SiCl_4$, weight average molecular weight is 304,000.
[2]60/40 Butadiene/styrene radial teleblock copolymer coupled with $SiCl_4$, weight average molecular weight is 300,000.
[3]Mixture of 2.0 parts by weight Agerite Geltrol, 0.5 parts by weight dilauryl thiodipropionate and 4.5 parts by weight [2,2'-thiobis(4-t-octylphenolato]-n-butylamino nickel(II) (Cyasorb 1084 from American Cyanamid Co.)
[4]Mixture of 2.0 parts by weight Agerite Geltrol and 0.5 parts by weight dilauryl thiodipropionate.
[5]ND = Not determined.

The data in Table II illustrate the generally improved canvas peel strengths for the inventive sealants of runs 4 and 6 compared to sealants of runs 3 and 5 containing no epoxy resin.

EXAMPLE III

The following comparative runs illustrate sealants which are outside the scope of this invention which are based on (non-hydrogenated) linear teleblock copolymers of butadiene and styrene and also on radial teleblock copolymers of butadiene and styrene which possess molecular weights below that of the broad range of this invention given above.

Identity and proportions of the various ingredients in the comparative runs of this example are given in the following recipe.

Recipe III

| Ingredient | Parts by Weight |
|---|---|
| Teleblock copolymer | 45 |
| Modifying resin[1] | 90 |
| Paraffinic oil | 77.1 |
| Calcium carbonate | 40.3 |
| Titanium dioxide | 13.4 |
| Zinc oxide | 13.4 |
| Stabilizer[2] | 2.5 |
| Epoxy resin[3] | Var |

[1]Mixture of 45 parts Piccotex 120 and 45 parts Pexalyn XA070.
[2]See footnote 4 of Table II
[3]See footnote 5 of Recipe I.

In Table III are given properties of comparative sealants compounded according to the above recipe.

Table III

| Run No. | 7 | 8 | 9 | 10 | 11 | 12 | 13 |
|---|---|---|---|---|---|---|---|
| Teleblock copolymer | E[1] | E | F[2] | F | G[3] | G | H[4] |
| Epoxy resin | 0 | 9 | 0 | 9 | 0 | 9 | 9 |
| Canvas peel, ppiw | | | | | | | |
| Glass, original | 11.0 | 4.8 | 7.25 | 3.5 | 4.15 | 0.9 | 9 |
| $H_2O$ treated | 1.95 | 1.0 | 4.25 | 0.35 | 2.25 | 0.3 | 3.5 |
| Concrete, original | 15.5 | 13 | 7.25 | 8 | 9.5 | 16.0 | 14.25 |
| $H_2O$ treated | 4.75 | 7.5 | 5.75 | 6.25 | 7.25 | 6.5 | 13.5 |
| Aluminum, original | 13.0 | 7.0 | 6.5 | 2.75 | 11.8 | 1.0 | 8.5 |
| $H_2O$ treated | 7.5 | 4.0 | 6.0 | 1.5 | 11.5 | 0.9 | 4.5 |

[1]Linear teleblock copolymer of 70/30 butadiene/styrene. Kraton 1101 from Shell.
[2]Linear teleblock copolymer of 70/30 butadiene/styrene. Kraton 1102 from Shell.
[3]70/30 Butadiene/styrene radial teleblock copolymer coupled with $SiCl_4$, $M_w$ = 149,000.
[4]60/40 Butadiene/styrene radial teleblock copolymer coupled with $SiCl_4$, $M_w$ = 129,000.

The data in Table III illustrate that in these comparative sealants the addition of uncured epoxy resin does not generally improve canvas peel strength over sealants without epoxy resin. Likewise the low molecular weight radial teleblock copolymer-based sealants of Runs 11, 12 and 13 do not show the improvement obtained in the inventive sealants of previous examples upon addition of epoxy resin.

Reasonable variations and modifications will be apparent to those skilled in the art can be made from this invention without departing from the spirit and scope thereof.

I claim:

1. A process for sealing an area between two surfaces comprising applying a composition to at least a portion of said area, said composition comprising
   a. 100 parts by weight of a block copolymer selected from the group consisting of
      aa. polymers of the structural formula $(S-D)_m Y$, bb. polymers of the structural formula $(S-D')_n Y$, and cc. polymers of the structural formula $S-D'-S$, wherein
      S is a block of polymerized styrene,
      D is a block of polymerized butadiene or isoprene,
      D' is a hydrogenated block of polymerized butadiene or isoprene,
      Y is a residue of a polyfunctional coupling agent or of a polyfunctional initiating agent,
      $m$ is an integer of above 2,
      $n$ is an integer of 2 or more,
      the block copolymer having a weight average molecular weight of
         aa. 200,000 to 750,000 for polymers aa.,
         bb. 50,000 to 500,000 for polymers bb. and cc.,
   b. 1 to 30 parts by weight of an epoxy resin,
   c. 10 to 250 parts by weight of a modifying resin,
   d. 25 to 250 parts by weight of a filler.

2. A process in accordance with claim 1 wherein a solution of said composition in up to 300 parts by weight of a solvent selected from the group consisting of saturated aliphatic, cycloaliphatic and aromatic hydrocarbons is applied to the area and wherein the solvent is thereafter removed.

3. A process in accordance with claim 2 wherein said solvent is selected from the group consisting of hydrocarbon solvents having 5 to 8 carbon atoms per molecule.

4. A process in accordance with claim 1 wherein said sealant composition is heated to a temperature in the range of 120 to 180° C. to render the sealant composition fluid, wherein said fluid sealant composition is applied to the area and wherein the sealant thereafter is cooled to generate a solid sealing.

5. A process in accordance with claim 1 wherein at least one of said surfaces is a non-porous surface.

6. A process in accordance with claim 5 wherein at least one of said surfaces is a glass or metallic surface.

7. An article produced in accordance with the process of claim 1.

8. An article produced in accordance with the process of claim 5.